United States Patent Office 3,116,268
Patented Dec. 31, 1963

---

3,116,268
POLYPHOSPHONAMIDE POLYMERS AND COPOLYMERS
John Farago, Wilmington, Del., assignor to E. I. du Pont de Nemours and Company, Wilmington, Del., a corporation of Delaware
No Drawing. Filed Dec. 21, 1955, Ser. No. 554,418
14 Claims. (Cl. 260—77.5)

This invention relates to a novel and useful product and a process for its preparation. More specifically it is concerned with a novel and useful phosphorus containing polymer.

It is an object of the present invention to provide a novel polyphosphonamide.

Another object is to provide flame-resistant shaped articles produced by blending in a common solvent a polyphosphonamide and a fiber-forming polymer.

A further object is to provide shaped articles from a copolymer of a polyphosphonamide.

These and other objects will become apparent in the course of the following specification and claims.

In accordance with the present invention a novel and useful polymer is provided having structural units of the formula

wherein —Z— is a divalent radical of the class consisting of -piperazino- and

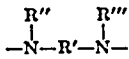

wherein X— represents chlorine and bromine and R— is a divalent hydrocarbon radical and R"— and R'"— are selected from the class consisting of hydrogen and monovalent hydrocarbon radical. Polymers of this formula may be prepared by mixing, at a temperature within a range of from about —20° to about 150° C., a phosphonyl halide of the formula

wherein X— represents chloride and bromine and R— is defined as above with a diamine of the formula

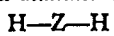

wherein —Z— is defined as above in a liquid which is a mutual solvent for each reactant, the said liquid being inert to each reactant and the product formed. The polymerization occurs essentially instantaneously within the temperature range. A contact period of at least from 2 to 20 minutes, however, is preferred. The homopolymer is useful in the preparation of flame-resistant shaped articles by blending it and a fiber-forming polymer in a common solvent and thereafter removing the solvent. Furthermore, when the polyphosphonamide is produced in the presence of an excess of diamine the product, a macro-diamine, may be further copolymerized with a diacid chloride by the "interphase" polymerization technique to produce a copolymer which is also capable of being formed into shaped articles.

The following examples are cited to illustrate the invention. They are not intended to limit it in any manner. The lowest temperature at which a fresh polymer sample begins to adhere or stick to a clean heated metal surface, such as a brass block, as the polymer is stroked with moderate pressure across the surface, is referred to herein as the "polymer stick temperature." Bulk polymer is supported manually or with tweezers, and powder or the like is manipulated with a spatula.

*Example 1*

4.6 grams 2,5-dimethylpiperazine and 7.8 grams phenylphosphonyl dichloride are stirred at room temperature in 50 cc. dry chloroform. The resulting solution is poured into water from which the chloroform is evaporated. A water immiscible highly viscous liquid which solidifies upon standing separates. The product is washed with diluted sodium hydroxide and hot water and thereafter dried under vacuum at 90° C. 6.0 grams or 71% of the theoretical amount of the polyphosphonamide is obtained. It has an inherent viscosity of 0.10 in m-cresol, a polymer stick temperature of 186° C. and is soluble in chloroform.

As indicated above, these polymers may be made employing any phosphonyl halide of the formula

wherein X— represents chlorine and bromine and R— is a monovalent organic radical. Among such materials may be mentioned aryl phosphonyl dichlorides and aryl phosphonyl dibromides such as, for instance, phenyl, chlorophenyl, diphenyl and naphthyl derivatives and alkyl phosphonyl dichlorides and dibromides, particularly lower alkyl derivatives such as the methyl, trichloromethyl, trifluoromethyl, ethyl, propyl and butyl derivatives. Cycloaliphatic compounds such as cyclohexyl phosphonyl dichloride and cyclohexyl phosphonyl dibromide may also be employed.

The phosphonyl dihalides are reacted in an inert solvent which will also dissolve the diamine employed. Suitable diamines include those of the formula

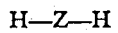

wherein —Z— is a divalent radical of the group consisting of piperazino and

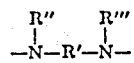

wherein R' is a divalent hydrocarbon radical, R" and R'" are radicals from the group consisting of hydrogen and monovalent hydrocarbon radical. Among suitable diamines may be mentioned ethylene diamine, propylene diamine, tetramethylene diamine, pentamethylene diamine, hexamethylene diamine, tetradecamethylene diamine, octadecamethylene diamine, N-alkyl substituted, N,N'-dialkyl substituted diamines of the above types, and the like. Cycloaliphatic diamines such as 1,2-, 1,3-, or 1,4-diamino cyclohexane, the bis(amino-cyclohexyl) alkanes and the like may also be used. Likewise piperazine and alkyl substituted piperazine are suitable as demonstrated above.

The nature of the solvent employed in the preparation of the polyphosphonamide is not critical. Chloroform and methylene chloride are convenient for this purpose. Light petroleum fractions are suitable as is also benzene, cyclohexane and dioxane. As mentioned above, temperatures as low as —20° C. may be employed. At times operation at room temperature or even temperatures as high as 150° C. may be more convenient. It is generally desirable to operate at temperatures somewhat below room temperature. A temperature within the range of —10° C. to 60° C. is preferred. The reaction is essentially instantaneous. Usually stirring is continued for from 2 to 20 minutes to insure completion of the reaction. Longer periods may be used if desired. Upon completion of the reaction the resulting solution is drowned in water and the solvent is separated. The product is usually a highly viscous liquid which solidifies slowly upon standing.

The polymer formed as described above may be conveniently incorporated into shaped articles such as fibers by blending it with a fiber-forming polymer in a liquid which is a common solvent for the phosphorus containing polymer and the fiber-forming polymer. Such a procedure is illustrated in Examples II and III.

*Example II*

3.9 grams phenylphosphonyl dichloride are dissolved in 30 cc. methylene chloride. The solution is cooled with Dry Ice and added to a similarly cooled solution of 2.2 grams m-phenylene diamine in 20 cc. methylene chloride. After stirring 10 minutes at −20° C., the resulting solution is allowed to warm to room temperature. Water is added and the methylene chloride is evaporated. A sticky residue which solidifies slowly upon standing separates out. It is dried under vacuum at 90° C. A yield of 4.4 grams or 95% of theoretical is obtained. The product, with a phosphorus content of 13.4%, possesses an inherent viscosity of 0.08 in m-cresol, and a polymer stick temperature of 228° C. It is soluble in dimethylformamide.

4 grams of the product of the above reaction are mixed with 16 grams polyacrylonitrile having an inherent viscosity of 1.9 in dimethylformamide and the mixture is dissolved in sufficient dimethylformamide to produce a solution containing 22% by weight of solids. The solution is extruded through a three-hole spinneret (orifice diameter of 0.08 mm.). The fiber produced is drawn 4 times its extruded length. It possesses a phosphorus content of 2.6% and will not propagate a flame in air. Its properties measured on the dry fiber at room temperature (A) and on the wet fiber at 90° C. (B) are as follows:

|  | (A) | (B) |
|---|---|---|
| Tenacity g/den | 2.3 | 0.89 |
| Elongation percent | 32 | 146 |
| Initial modulus g/den | 61 | 3.3 |
| Denier | 5.1 | 5.0 |

*Example III*

3.9 grams phenylphosphonyl dichloride are dissolved in 50 cc. methylene chloride. The solution is cooled with Dry Ice and added to a similarly cooled solution of 2.3 grams hexamethylene diamine in 100 cc. methylene chloride. After stirring for 10 minutes at −20° C., the resulting solution is warmed to room temperature. It is thereafter poured into water. A sticky mass which solidifies slowly separates. A yield of 4.8 grams or 100% of theoretical is obtained. The product, with a phosphorus content of 13%, possesses an inherent viscosity of 0.08 in m-cresol and a polymer stick temperature of 134° C. It is soluble in chloroform and in formic acid.

The polymer of the above reaction is mixed, in a ratio of 1:4, with a polymer having an inherent viscosity of 3.0 in m-cresol and made from 2,5-dimethylpiperazine and terephthalic acid. Polymeric 2,5-dimethylpiperazine terephthalamide and its preparation is disclosed in Belgian Patent No. 529,414. The polymer is made in a manner analogous to the production of other polyamides as is known in the art. The mixture is dissolved in sufficient formic acid to form a solution containing 12.5% by weight of solids and spun in the equipment of Example II. The fiber possesses a phosphorus content of 2.14% and will not propagate a flame in air. Properties of this undrawn fiber are measured on the dry fiber at room temperature (A) and on the wet fiber at 90° C. (B) with results as follows:

|  | (A) | (B) |
|---|---|---|
| Tenacity g/den | 0.75 | 0.58 |
| Elongation, percent | 178 | 259 |
| Initial modulus g/den | 16 | 6.1 |
| Denier | 6.7 | 6.9 |

As is illustrated above the polyphosphonamide is blended with a fiber-forming polymer by dissolving the two polymers together in a common solvent and thereafter removing the solvent. In general, those polyphosphonamides prepared from aliphatic, cycloaliphatic and heterocyclic (i.e., piperazine) diamines are soluble in chloroform or formic acid and hence compatible with fiber-forming polymers of the type formed from 2,5-dimethylpiperazine and terephthalic acid. The polyphosphonamides prepared from aromatic diamines (cf. Example II), being soluble in dimethyl formamide, may be blended with fiber-forming polyacrylonitrile. Shaped articles may then be prepared from the solution of the mixed polymers either by the conventional casting, extrusion, wet or dry spinning, or the like.

While the proportion of polyphosphonamide in the blended polymer may vary considerably depending upon the particular structure of the polyphosphonamide as well as the nature of the fiber-forming polymer with which it is blended, in general it is desirable that the final product contain at least about 1% phosphorus or about 5% polyphosphonamide to provide detectable fire retardency. The presence of from about 2 to about 5% phosphorus is preferred. As high as 40–60% polyphosphonamide can be included within the polymer blend without introducing difficulties into shaped article fabrication. Among the fiber-forming polymers which are suggested for use in polymer blends with polyphosphonamides may be mentioned polymers of acrylonitrile, including the homopolymer and copolymers wherein the acrylonitrile component constitutes at least about 40% of the polymer molecule calculated as $CH_2=CH-CN$, such as those shown in U.S. Patent No. 2,491,471 and also the compatible polyamides such as poly-2,5-dimethylpiperazine terephthalamide, polyhexamethylene adipamide, polyhexamethylene sebacamide, and the like.

When the polyphosphonamide of the present invention contains terminal reactive hydrogen, i.e., it corresponds to the formula

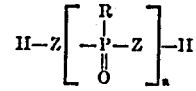

wherein $n$ is a large integer and Z and R are defined as above, it may be condensed in an interphase polymerization with a dicarbonyl chloride compound from the class consisting of phosgene, a bis-chloroformate and a dicarboxylic acid chloride. In accordance with this technique the reactants are brought together in such a way that the reaction zone is at, or is immediately adjacent to, a liquid-liquid interface and most of the molecules of at least one of the intermediates must diffuse through liquid diluent to arrive at the reaction zone. The process for accomplishing this comprises bringing together the diamine in one liquid phase and the organic acid halides in a second liquid phase immiscible with the first phase, mixing the liquid phases to form a system comprised of two liquid phases such that the diamine and acid halide are in separate phases and at least one of the phases includes a liquid diluent, maintaining the phases in admixture until the desired condensation polymerization has taken place, and then, if desired, separating the resulting polyphosphonamide. Preferably, one intermediate is a liquid under the reaction conditions or is dissolved in a diluent, but one of the intermediates may be a finely divided solid dispersed or suspended in a diluent in which the intermediate is at least partially soluble. The following examples illustrate the interphase technique.

*Example IV*

2.1 grams bis(4-aminocyclohexyl)methane and 0.26 gram methylphosphonyl dichloride are refluxed for 1 hour in 40 cc. dry chloroform. The resulting solution is cooled and added to 100 cc. water containing 0.8 gram sodium hydroxide and 5 cc. of a solution containing 2% by weight of sodium lauryl sulfate. 1.6 gram (0.008 mol) terephthaloyl dichloride dissolved in 30 cc. chloroform is added and the mixture is stirred for 15 minutes at room temperature. The precipitated copolymer is collected on a filter. It is washed with a dilute aqueous solution of sodium hydroxide followed by hot water, and is thereafter dried in a vacuum oven at 90° C. A yield of 3.28 grams or 95% of theory is obtained. A film cast from the copolymer contains 2.05% phosphorus and will not propagate a flame in air. Its inherent viscosity in m-cresol is 0.46. It may be formed into fibers by conventional dry spinning from a formic acid solution.

*Example V*

The methylphosphonyl dichloride of Example IV is replaced by 0.32 gram isopropylphosphonyl dichloride. The copolymer yield is 2.7 grams or 80% of theoretical. A film cast from the product has a phosphorus content of 1.66% or 93% of theoretical. Its inherent viscosity in m-cresol is 0.48. It does not propagate a flame in air.

*Example VI*

0.36 gram of secondary butylphosphonyl dichloride is substituted for the methylphosphonyl dichloride of Example IV. A yield of 3.4 grams (100% of theoretical), containing 1.95% phosphorus is obtained. It has an inherent viscosity of 0.54 in m-cresol.

*Example VII*

In another variation of Example IV, without benefit of a dispersing agent, methylphosphonyl dichloride is replaced by 0.3 grams of ethylphosphonyl dichloride. A 3.2 grams yield (94% of theoretical) results. The polymer has an inherent viscosity of 0.41 in m-cresol and contains 1.94% phosphorus.

*Example VIII*

2.15 grams of piperazine and 0.665 gram methylphosphonyl dichloride are refluxed 1 hour in 100 cc. of chloroform. The solution is then cooled and added with stirring to 250 cc. of water containing 2 grams sodium hydroxide and 0.25 gram of sodium lauryl sulfate. To the emulsion so formed 4.18 grams hexahydroterephthaloyl dichloride is added. After stirring 15 minutes at room temperature, the product is filtered off, washed with hot water, and dried under vacuum at 90° C. The yield is 3.6 grams or 70% of theoretical. The inherent viscosity of the copolymer is 0.51 in m-cresol, its phosphorus content is slightly over 2% and its shaped forms do not propagate a flame in air.

*Example IX*

4.3 grams of the bis-chloroformate of tetramethylene glycol is substituted for the hexahydroterephthaloyl dichloride of Example VIII. The polymer formed stays in solution in the chloroform layer. It is precipitated by adding hexane to the reaction mixture. A yield of 4 grams or 80% of theoretical is obtained. The copolymer contains 2.1% phosphorus and has an inherent viscosity of 0.45 in m-cresol.

*Example X*

A solution of 2 grams of phosgene in 20 cc. toluene is substituted for the hexahydroterephthaloyl dichloride of Example VIII. The product precipitates out. It is filtered off, washed with hot water and dried under vacuum at 90° C. A yield of 2 grams or 67% of theoretical of a polymer containing 4.2% phosphorus and having an inherent viscosity of 0.37 in m-cresol is obtained.

The copolymers of the present invention, as illustrated above, may be represented as a polymer containing linkages from the class consisting of amide, urea and urethane linkages and phosphonamide linkages of the formula

wherein —Z— is a divalent radical of the group consisting of -piperazino- and

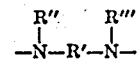

wherein R— is a monovalent organic radical, —R'— is a divalent hydrocarbon radical and R"— and R'''— are selected from the group consisting of hydrogen and monovalent hydrocarbon radical. The amide, urea and urethane linkages may be conveniently represented as follows:

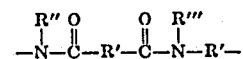

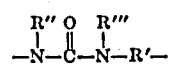

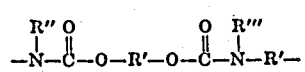

wherein —R'— is a divalent hydrocarbon radical and R"— and R'''-- are members at the class consisting of hydrogen and monovalent hydrocarbon radical.

As demonstrated, the reaction to form the copolymer is most advantageously effected by dissolving the polyphosphonamide product in water and adding a solution of the acid halide in an inert, water-immiscible organic solvent with strong agitation. Although not required, it is often desirable to have an emulsifying agent in the aqueous phase. In fact, advantage is gained in some instances by forming an emulsion of the aqueous polyphosphonamide diamine solution with the organic solvent for the acid halide coreactant before the coreactant is added. It is also advantageous to incorporate in the emulsion an alkaline neutralizing agent for the by-product hydrogen halide. The alkaline neutralizing agent may be excess diamine, a tertiary amine, or an inorganic alkaline material, such as an alkali metal hydroxide, carbonate, or phosphate. Ordinarily, at least sufficient alkaline material is used to react with the theoretical amount of hydrogen halide to be liberated from the condensation reaction. Stirring is continued at high speed after addition of all the ingredients to insure completion of the reaction, and the solid polymer is filtered from the liquid phase and dried. In the preparation of the homopolymer, it is essential that the solvent or diluent employed be inert toward each reactant. However, in the preparation of the copolymer by the interphase technique it is not essential for the solvent or diluent used in one phase to be completely inert to the reactant in the other phase, but it is essential that two reactants be more reactive toward each other than either reactant is to the solvent or diluent of the other phase.

Sometimes it is desirable to load the solvent for the respective reactant with non-reactive solutes so as to produce, for example, a better yield, or a higher molecular weight, or a more useful polymer. Such non-reactive substances may be salts such as sodium chloride, potassium bromide, lithium sulfate, and the like for loading the aqueous phase.

The above process may be carried out in a large number of variations. In some cases, it is desirable to add the emulsifier to the diamine solution before the acid chloride-containing second phase is added. In other cases, a simultaneous addition of alkali and the second phase, containing the acid chloride, is preferred.

The process for the preparation of the copolymers of the present invention by the interphase polymerization technique can be carried out over a considerable range of temperatures from just above the freezing point of the phase having the highest freezing point up to temperatures at which decomposition products form to an objectionable extent. However, in view of the rapidity with which fiber-forming polyphosphonamides are formed at moderate temperatures, there is no advantage in using temperatures higher than about 100° C., and it is preferred that the reaction be carried out in the moderate temperature range of 0° C. to 80° C.

Since the reaction rate of diamines with organic acid chlorides is rapid at room temperature, it is preferable that the addition of the two phases containing the separate reactants be accompanied by sufficiently rapid stirring to produce an emulsion of fine particle size. Such emulsions may be equally well produced by other means, for example, by impinging two high velocity liquid streams upon each other in a suitable manner. When an emulsion of fine particle size is provided, the available diamine and/or the acid halide is completely used up in a matter of a few minutes, depending to an extent on the sum total of the reaction conditions.

The reactants do not need to be employed in equivalent proportions. The excess of one reactant simply remains in the supernatant liquid from which the copolyphosphonamides precipitate. It has been found that the interfacial polymerization process of diamines with organic acid halides yields copolyphosphonamides of high molecular weight whether one reactant is in excess by 300% or even more, or whether the reactants are in equivalent amounts. For purposes of economy, it is usually desirable to employ the reactants in equivalent amounts.

Where one phase is aqueous the emulsifying agents may be cationic, anionic, or non-anionic. A representative example of a cationic emulsifying agent is "Lorol" pyridinium chloride (E. I. du Pont de Nemours and Company, the pyridinium chloride of a mixture of aliphatic alcohols obtained by hydrogenation of cocoanut oil). Representative examples of nonionic agents are the "Tweens" (Atlas Powder Company, polyoxyethylene derivatives of sorbitan monoesters of long-chain fatty acids). Representative examples of anionic emulsifying agents are soaps, the amine salts, sodium lauryl sulfate and the like.

The copolymer formed by the interphase polymerization as described above can be formed into fibers by conventional dry spinning from a solvent such as formic acid or the like. Those which are stable at the melt, may be melt-spun.

The presence of the phosphonamide linkages tends to improve flame retardency characteristics of shaped articles even when present in minor proportions. While the lower limit of phosphorus content necessary to prevent flame propagation in the shaped article will vary somewhat according to the nature of the particular polymer, nevertheless the presence of about 1% is generally effective in producing measurable results. Higher percentages are preferred. Generally from about 2 to about 5% phosphorus is preferred, as in the case of the blended polymers.

The phosphonamide linkages containing copolymers described in detail hereinbefore have utility in many and varied fields. They may serve as ingredients of coating compositions, they can be spun into continuous filaments, or they can be molded into useful plastic articles. The new class of flameproof and self-extinguishing copolymers are very valuable and useful in the manufacturing of all textile materials where flameproofness is desirable, as for example, in knitted, woven, and non-woven garments; in curtains, draperies, carpets, brush pile fabrics; etc. The highly flameproof homopolymers obtained in the process of the invention can also be used to reduce flammability of synthetic or natural fiber filaments.

Many apparent modifications will be apparent to those skilled in the art without a departure from the inventive concept.

What is claimed is:

1. A homopolymeric linear polyphosphonamide consisting essentially of recurring units of the formula

wherein —Z— is a divalent radical of the group consisting of -piperazino- and

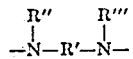

wherein R— is a monovalent hydrocarbon radical, —R'— is a divalent hydrocarbon radical and R"— and R'"— are selected from the group consisting of hydrogen and monovalent hydrocarbon radicals.

2. A homopolymeric linear polyphosphonamide consisting essentially of recurring units of the formula

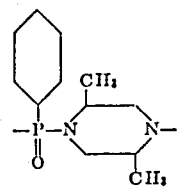

wherein the hexagon represents the benzene nucleus.

3. A homopolymeric linear polyphosphonamide consisting of recurring units of the formula

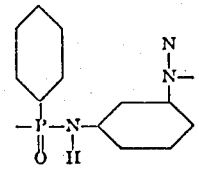

wherein the hexagon represents the benzene nucleus.

4. A homopolymeric linear polyphosphonamide consisting of recurring units of the formula

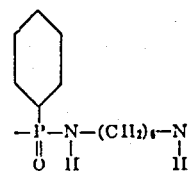

wherein the hexagon represents the benzene nucleus.

5. A homopolymeric linear polyphosphonamide consisting essentially of recurring units of the formula

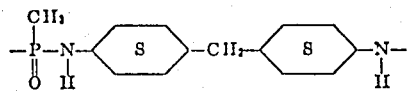

6. A homopolymeric linear polyphosphonamide consisting essentially of recurring units of the formula

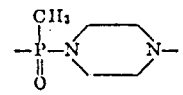

7. A process for the preparation of a copolymer which comprises polymerizing by an interphase technique wherein the reactants are brought together at a liquid-liquid interface and most of the molecules of at least one of the intermediates must diffuse through liquid diluent to arrive at the reaction zone, a polyphosphonamide of the formula

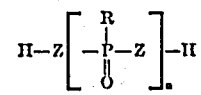

wherein R is a monovalent hydrocarbon radical; Z is a divalent radical of the group consisting of piperazino and

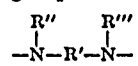

wherein R' is a divalent hydrocarbon radical and R" and R'" are selected from the group consisting of hydrogen and a monovalent hydrocarbon radical with a member of the class consisting of phosgene, a divalent hydrocarbon bis-chloroformate and a dicarboxylic acid chloride and $n$ is a large number.

8. A synthetic, linear, fiber-forming composition of matter consisting essentially of fiber-forming polyacrylonitrile and at least about 5% by weight of a homopolymeric linear polyphosphonamide consisting essentially of recurring units of the formula

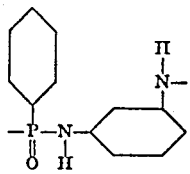

wherein the hexagon represents the benzene nucleus.

9. A synthetic, linear, fiber-forming composition of matter consisting essentially of fiber-forming, 2,5-dimethylpiperazine terephthalamide and at least about 5% by weight of the polyphosphonamide of claim 3.

10. A synthetic, linear, fiber-forming copoly(carbonamide-phosphonamide) wherein recurring carbonamide and phosphonamide linkages are an integral part of the linear polymer chain, consisting essentially of polyphosphonamide structures having recurring units of the formula

wherein R is a monovalent hydrocarbon radical; Z is a divalent radical of the group consisting of piperazino and

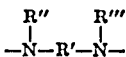

wherein R′ is a divalent hydrocarbon radical and R″ and R‴ are selected from the group consisting of hydrogen and a monovalent hydrocarbon radical, said polyphosphonamide structures being linked through terminal amino nitrogen by a divalent radical selected from the group consisting of

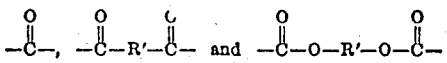

wherein R′ is a divalent hydrocarbon radical.

11. The copolymer of claim 10 wherein the said polyphosphonamide recurring units are

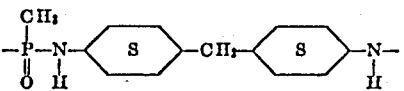

and the said divalent radical providing carbonyl linkage is terephthaloyl.

12. A copolymer as defined in claim 10 wherein the said polyphosphonamide recurring units are

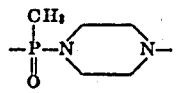

and the said divalent radical providing carbonyl linkage is hexahydroterephthaloyl.

13. A copolymer as defined in claim 10 wherein the said polyphosphonamide recurring units are

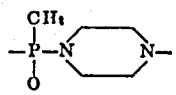

and the said divalent radical providing carbonyl linkage is the diformate of butylene glycol.

14. A linear polyphosphonamide consisting essentially of recurring units of the formula

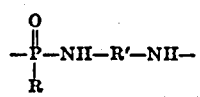

wherein each of R and R′ is a hydrocarbon radical.

References Cited in the file of this patent
UNITED STATES PATENTS

| | | |
|---|---|---|
| 2,130,523 | Carothers | Sept. 20, 1938 |
| 2,642,413 | Coover | June 16, 1953 |
| 2,666,750 | Dickey et al. | Jan. 19, 1954 |
| 2,732,367 | Shokal | Jan. 24, 1956 |

UNITED STATES PATENT OFFICE
CERTIFICATE OF CORRECTION

Patent No. 3,116,268                                     December 31, 1963

John Farago

It is hereby certified that error appears in the above numbered patent requiring correction and that the said Letters Patent should read as corrected below.

Column 8, lines 23 to 29, the formula should appear as shown below instead of as in the patent:

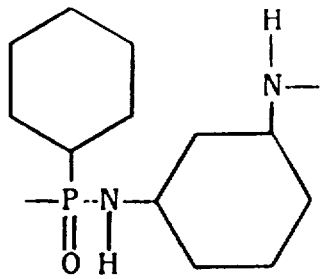

column 10, lines 21 to 25, the formula should appear as shown below instead of as in the patent:

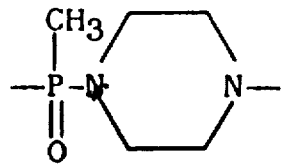

Signed and sealed this 19th day of May 1964.

(SEAL)
Attest:

ERNEST W. SWIDER                                  EDWARD J. BRENNER
Attesting Officer                                  Commissioner of Patents